(12) United States Patent
Nishi et al.

(10) Patent No.: US 11,529,912 B2
(45) Date of Patent: Dec. 20, 2022

(54) WIRE HARNESS

(71) Applicant: SUMITOMO WIRING SYSTEMS, LTD., Yokkaichi (JP)

(72) Inventors: Yuji Nishi, Yokkaichi (JP); Yuki Morimoto, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/196,462

(22) Filed: Mar. 9, 2021

(65) Prior Publication Data
US 2021/0291759 A1 Sep. 23, 2021

(30) Foreign Application Priority Data
Mar. 19, 2020 (JP) .............................. JP2020-049326

(51) Int. Cl.
*B60R 16/02* (2006.01)
(52) U.S. Cl.
CPC ................................ *B60R 16/0215* (2013.01)
(58) Field of Classification Search
CPC . B60R 16/02; B60R 16/0207; B60R 16/0222; B60R 16/0215
See application file for complete search history.

(56) References Cited

U.S. PATENT DOCUMENTS

| 10,077,013 | B2 | 9/2018 | Sugino et al. | |
| 2003/0213607 | A1* | 11/2003 | Katsumata | ............... E05D 5/062 |
| | | | | 174/68.3 |
| 2019/0123531 | A1* | 4/2019 | Yoshimura | ........... H02G 3/0691 |

FOREIGN PATENT DOCUMENTS

| CN | 202694951 U | * | 1/2013 | ............. H01F 17/06 |
| CN | 208368190 U | * | 1/2019 | ............. B60R 16/02 |
| JP | H10160047 A | * | 6/1998 | ............. B60R 16/02 |
| JP | 2009064674 A | * | 3/2009 | ........... H01B 13/012 |
| JP | 2014130708 A | * | 7/2014 | ............... H04B 3/36 |
| JP | 2016-096595 A | | 5/2016 | |
| JP | 2017011833 A | * | 1/2017 | ............. B60R 16/02 |

* cited by examiner

*Primary Examiner* — Paresh Paghadal
(74) *Attorney, Agent, or Firm* — Oliff PLC

(57) ABSTRACT

A wire harness including: a wire; a cover that covers the wire; and a cushion provided between the wire and the cover, wherein: the cover is provided with a hole in an intermediate portion of the cover in an extension direction of the wire, and the cushion is provided between the hole and the wire in a first direction intersecting the extension direction.

4 Claims, 4 Drawing Sheets

WIRE HARNESS

BACKGROUND

The present disclosure relates to a wire harness.

JP 2016-96595A discloses a wire protection pipe (referred to as a "pipe" hereinafter) for protecting wires routed under the floor of a vehicle. This pipe is made of resin and has a flattened elliptic cross section, and wires are inserted thereinto. A drainage hole is provided in a lower wall portion of the pipe that is located on the lower side when the pipe is attached to a vehicle.

SUMMARY

When the pipe is provided with the drainage hole, it is necessary to protect the wires from foreign substances entering the pipe. This problem is not limited to the cases where a drainage hole is provided as in the case of the wire protection pipe described above, and is common to the cases where a hole is provided in a wire protection member for any purpose.

An exemplary aspect of the disclosure provides a wire harness in which damage to a wire caused by foreign substances that have entered through a hole provided in a protective member can be suppressed using a simple configuration.

A wire harness of the present disclosure includes a wire; a cover that covers the wire; and a cushion provided between the wire and the cover, wherein the cover is provided with a hole in an intermediate portion of the cover in an extension direction of the wire, and the cushion is provided between the hole and the wire in a first direction intersecting the extension direction.

With the present disclosure, damage to a wire caused by foreign substances that have entered through a hole provided in a cover can be suppressed using a simple configuration.

DETAILED DESCRIPTION OF EMBODIMENTS

Figure 1:
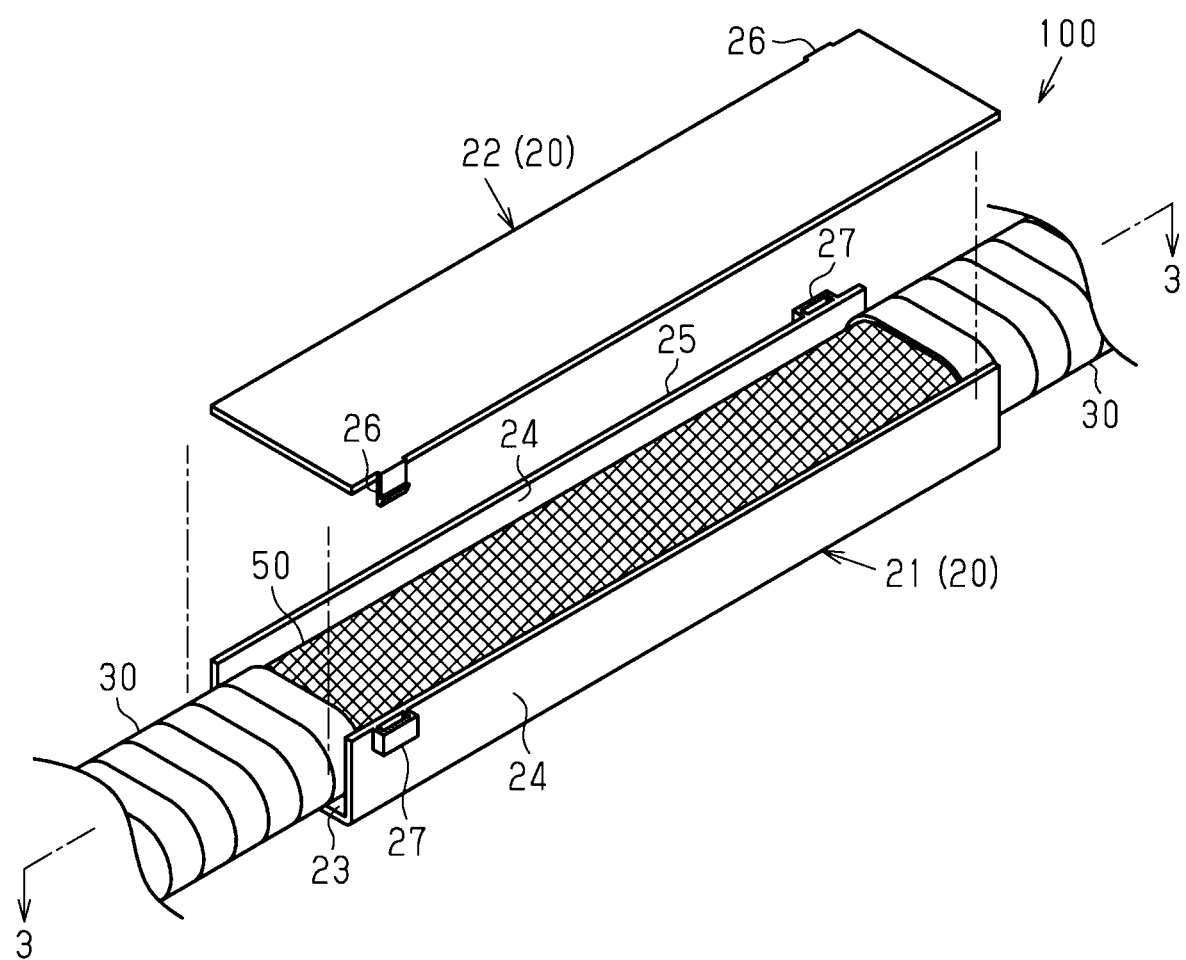
FIG. 1 is a perspective view of an embodiment of a wire harness showing a state in which a protective member is divided into a main body portion and a lid portion.

Description of Embodiments of the Present Disclosure

First, embodiments of the present disclosure will be listed and described.

A wire harness of the present disclosure is (1) a wire harness including a wire; a protective member that covers the wire; and an impact-resistant member provided between the wire and the protective member, wherein the protective member is provided with a hole in an intermediate portion of the protective member in an extension direction of the wire, and the impact-resistant member is provided between the hole and the wire in a first direction intersecting the extension direction.

With this configuration, foreign substances that have entered the protective member through the hole hit the impact-resistant member. Accordingly, the foreign substances that have entered the protective member through the hole are inhibited from directly hitting the wire. Therefore, damage to the wire caused by foreign substances that have entered through the hole provided in the protective member can be suppressed using a simple configuration.

(2) It is preferable that a plurality of the wires are provided, and the impact-resistant member covers each of the wires.

With this configuration, the impact-resistant member covers each of the wires, and therefore, the wires are inhibited from coming into direct contact with each other. Accordingly, a countermeasure against short circuit between the wires need not be separately taken, and thus the structure of the wire harness is inhibited from being complicated.

(3) It is preferable that a braided member made of metal that covers the wire is provided inside the protective member, wherein the impact-resistant member is provided between the wire and the braided member.

With this configuration, the braided member made of metal is provided, thus making it possible to reduce noise caused by the wire harness.

Also, with the above-mentioned configuration, the impact-resistant member is provided between the wire and the braided member, and thus the braided member is inhibited from coming into contact with the wire even when foreign substances that have enter through the hole hit the braided member. Therefore, a countermeasure against a short circuit between the braided member and the wire need not be separately taken, and thus the structure of the wire harness provided with the braided member is inhibited from being complicated.

Details of Embodiment of the Present Disclosure

The following describes specific embodiments of a wire harness of the present disclosure with reference to the drawings. A portion of the configuration may be exaggerated or simplified for illustrative reasons in the diagrams. In addition, the ratios between the dimensions shown in the diagrams may be different from each other. It should be noted that the present disclosure is not limited to these embodiments and is defined by the scope of the appended claims, and all changes that fall within the same essential spirit as the scope of the claims are intended to be included therein. The terms "parallel" and "orthogonal" as used herein encompass not only "precisely parallel" and "precisely orthogonal" but also "substantially parallel" and "substantially orthogonal", as long as the functions and effects of these embodiments are exhibited.

As shown in FIGS. 1 to 4, a wire harness 100 includes wires 10 and a protective member 20 (cover) having an elongated shape that covers the wires 10, and is to be routed under the floor of a vehicle, for example.

Devices (not shown) such as an inverter and a motor installed in a vehicle are electrically connected using the wires 10, and two wires are routed side by side in this embodiment.

Each of the wires 10 includes a conductive core wire 11, and an insulating coating 12 made of resin that covers the outer circumference of the core wire 11.

The protective member 20 includes: a main body portion 21 with a recessed cross-sectional shape that includes a bottom wall 23 on which the wires 10 are placed, and two side walls 24 that extend from the two side edges of the bottom wall 23 and are orthogonal to the bottom wall 23; and a rectangular plate-like lid portion 22 that covers an opening 25 located between the protruding ends of the two side walls 24. It should be noted that the main body portion 21 and the lid portion 22 are formed using various materials such as resin materials and metal materials. In this embodiment, the main body portion 21 and the lid portion 22 are formed by molding a resin material such as polypropylene (PP). In this case, the weights of the main body portion 21 and the lid portion 22 can be easily reduced compared with a case where another material such as a metal material is used.

The lid portion 22 includes locking portions 26 provided at the two side edges in the width direction thereof. Two locking-target portions 27 are provided at positions on the side walls 24 of the main body portion 21 that are opposed to the locking portions 26, and the lid portion 22 is attached to the main body portion 21 by locking the locking portions 26 to the locking-target portions 27. That is, portions of the wires 10 in the extension direction are covered by the bottom wall 23, the two side walls 24, and the lid portion 22 from four sides.

Figure 2:
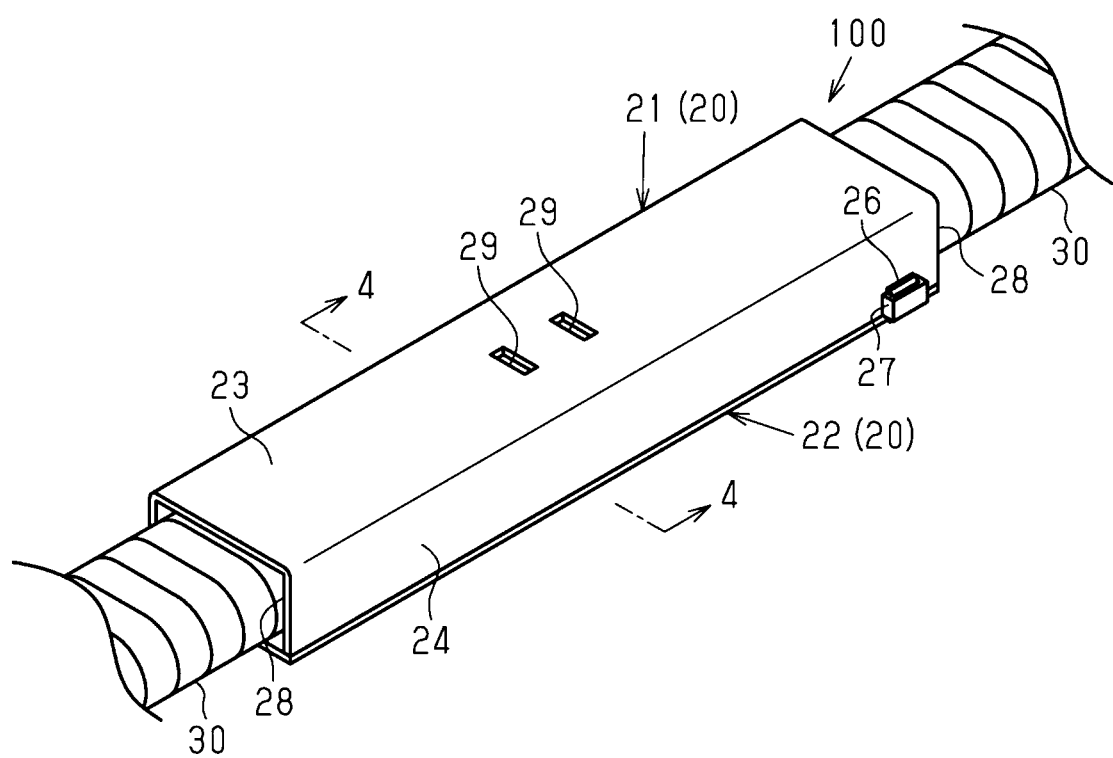
FIG. 2 is a perspective view of the embodiment of a wire harness shown in FIG. 1 as viewed from the opposite side.

As shown in FIG. 2, the protective member 20 is provided with two insertion holes 28 that are formed by the two edges of the main body portion 21 and the two edges of the lid portion 22 in the extension direction. Portions of the wires 10 that extend from the two insertion holes 28 toward the outside of the protective member 20 are covered by exterior members 30 that are more flexible than the protective member 20. It should be noted that, in this embodiment, a bellows-shaped corrugated tube having a flattened elliptic cross section is used as the exterior member 30. Non-conductive resin materials such as polyolefins, polyamides, polyesters, and ABS resins are used as a material of the corrugated tube of this embodiment.

One of the two end portions of each exterior member 30 in the extension direction is inserted into the protective member 20 through the insertion hole 28. That is, at the two ends of the protective member 20, the protective member 20 overlaps the exterior members 30 in the radial direction.

Figure 3:
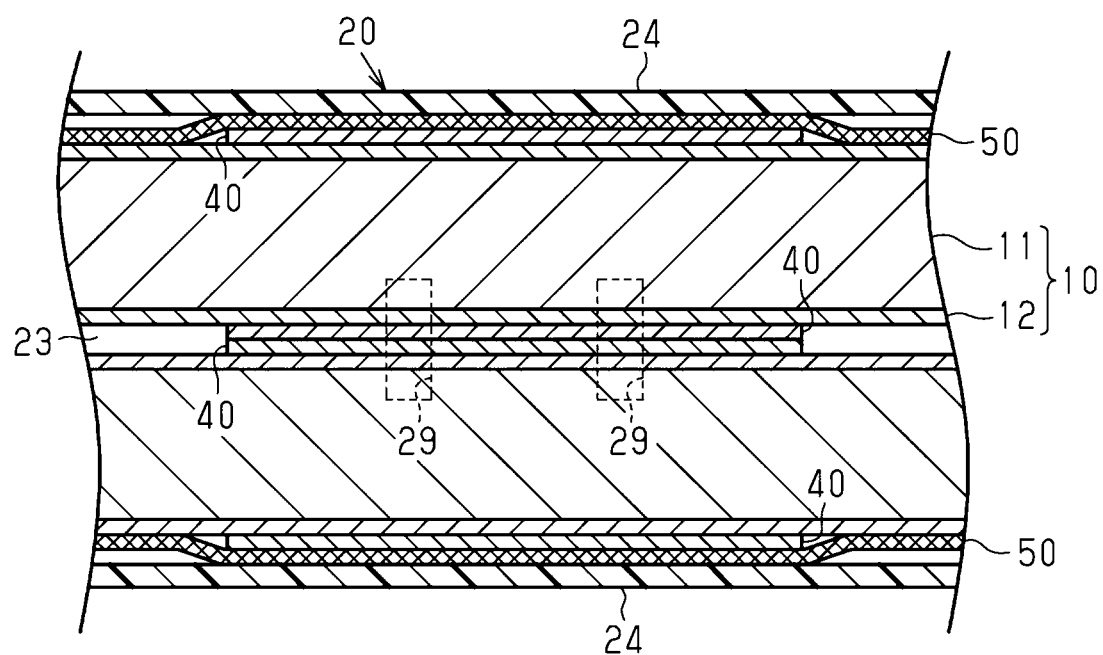
FIG. 3 is a cross-sectional view taken along line 3-3 in FIG. 1.

As shown in FIGS. 2 and 3, the protective members 20 is provided with rectangular holes 29 that are open in a first direction, which intersects the extension direction of the wires 10. More specifically, two holes 29 are provided in the bottom wall 23 of the protective member 20 and are lined up in the extension direction of the wires 10. In this embodiment, the first direction intersects the extension direction of the wires 10 at a right angle, and both of the two holes 29 are open in the first direction, which intersects the extension direction of the wires 10 at a right angle. The holes 29 are openings that are provided separately from the insertion holes 28 through which the wires are drawn to the outside of the protective member 20. The holes 29 are provided in intermediate portions of the protective member 20 in the extension direction of the wires 10. In other words, the holes 29 are provided between the two insertion holes 28. In this case, when the protective member 20 is installed on a vehicle such that the holes 29 are open toward the lower side in the vertical direction, for example, the holes 29 function as holes for drainage of water gathered in the protective member 20. It should be noted that the holes 29 correspond to the "hole" described in "Description of Embodiments of the Present Disclosure".

As shown in FIG. 3, the wire harness 100 includes impact-resistant members 40 (cushions) provided between the wires 10 and the protective member 20.

The impact-resistant members 40 are constituted by a mixture of amide fibers and PET fibers, for example, and are preferably constituted by a mixture of aramid fibers and PET fibers. The impact-resistant members 40 function as cushioning materials for protecting the wires 10 inside the protective member 20 from foreign substances.

The impact-resistant members 40 extend along the wires 10. The two ends of each impact-resistant members 40 are located inside the protective member 20.

The impact-resistant members 40 are provided between the two holes 29 and the wires 10 in the above-mentioned first direction, and individually cover the two wires 10.

As shown in FIGS. 1 and 3, the wire harness 100 includes a braided member 50 (braid) made of metal that covers the wires 10 inside the protective member 20. The impact-resistant members 40 are provided between the wires 10 and the braided member 50.

The braided member 50 is a tubular member formed by braiding a plurality of metal strands, and collectively covers the two wires 10. The braided member 50 functions as an electromagnetic shield, and reduces noise caused by the wire harness 100.

As shown in FIGS. 1 and 3, the braided member 50 extends along the wires 10. The two ends of the braided member 50 are inserted into the exterior members 30 and are fixed to the end portions of the exterior members 30. It should be noted that the braided members 50 may individually cover the wires 10.

As shown in FIG. 3, regarding a portion of the protective member 20 other than the two end portions of the protective member 20 and the holes 29, the wires 10, the braided member 50, and the protective member 20 overlap in the stated order from the inner side of the protective member 20.

Figure 4:
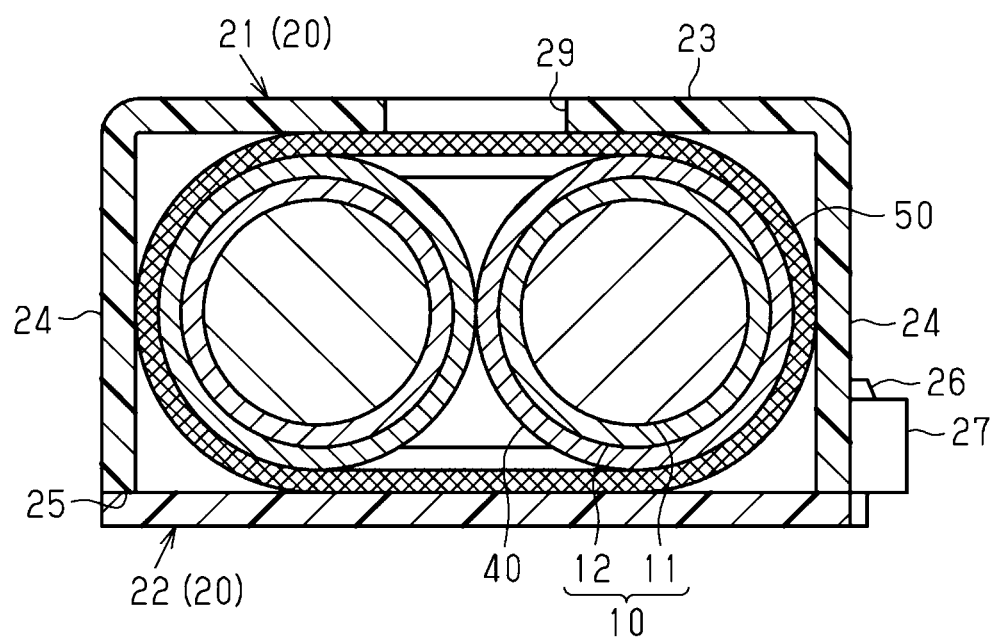
FIG. 4 is a cross-sectional view taken along line 4-4 in FIG. 2.

On the other hand, as shown in FIG. 4, regarding portions of the protective member 20 in which the holes 29 are open, the wires 10, the impact-resistant members 40, and the braided member 50 overlap in the stated order from the inner side of the protective member 20.

The following describes the functions of this embodiment.

Even when flying stones, water splashes, or the like are headed towards the holes 29 of the protective member 20 while a vehicle is traveling, and foreign substances such as small stones enter the protective member 20 through the holes 29, the foreign substances such as small stones hit the impact-resistant members 40. As a result, the foreign substances that have entered the protective member 20 through the holes 29 are inhibited from directly hitting the wires 10.

The following describes the effects of this embodiment.

(1) The protective member 20 is provided with the holes 29 in intermediate portions of the protective member 20 in the extension direction of the wires 10, and the impact-resistant members 40 are provided between the holes 29 and the wires 10 in the first direction, which intersects the extension direction of the wires 10.

With such a configuration, the above-described functions are exhibited. In addition, the need to separately provide a structure for inhibiting foreign substances from entering through the holes 29, such as a filter or lid that covers the holes 29, is reduced, thus making it possible to inhibit the structure of the protective member 20 from being complicated. Therefore, damage to the wires 10 caused by foreign substances that have entered through the holes 29 provided in the protective member 20 can be suppressed using a simple configuration.

On the other hand, with the above-mentioned configuration, when the protective member 20 is installed on a vehicle such that the holes 29 are open toward the lower side in the vertical direction, water that has entered the protective member 20 is discharged to the outside thereof through the holes 29. Therefore, water in the protective member 20 can be removed.

(2) A plurality of the wires 10 are provided, and the impact-resistant member 40 covers each of the wires 10.

If the protective member 20 collectively covers the wires 10, and no countermeasures against short circuits between the wires 10 are taken, damage to the wires 10 may cause short circuit between the wires 10.

To address this, with the above-mentioned configuration, the impact-resistant member 40 covers each of the wires 10, and the wires 10 are therefore inhibited from coming into direct contact with each other. Accordingly, a countermeasure against a short circuit between the wires 10 need not be separately taken, and thus the structure of the wire harness 100 is inhibited from being complicated.

(3) The impact-resistant members 40 are provided between the wires 10 and the braided member 50.

If the braided member 50 covering the wires 10 is provided inside the protective member 20, and no countermeasures against a short circuit between the wires 10 and the braided member 50 are taken, damage to the wires 10 may cause a short circuit between the wires 10 and the braided member 50.

To address this, with the above-mentioned configuration, the impact-resistant members 40 are provided between the wires 10 and the braided member 50, and therefore, the braided member 50 is inhibited from coming into contact with the wires 10 even when foreign substances that have enter through the holes 29 hit the braided member 50. Therefore, a countermeasure against a short circuit between the wires 10 and the braided member 50 need not be separately taken, and thus the structure of the wire harness 100 is inhibited from being complicated.

Modified Examples

This embodiment can be implemented with various modifications as follows. This embodiment and the following modified examples can be used in combination with each other as long as they are compatible with each other.

The braided member 50 may be omitted. The braided member 50 may be arranged between the impact-resistant members 40 and the wires 10.

Although the number of wires 10 is two in the example shown in this embodiment, the number of wires 10 is not limited thereto and can be changed as appropriate. That is, the number of wires 10 may be one, or three or more wires 10 may be provided.

The shape of the impact-resistant member 40 is not limited to that shown as an example in this embodiment, and the impact-resistant member 40 may be provided inside the protective member 20 over the entire length in the extension direction of the wires 10.

There is no limitation to the configuration in which a mixture of amide fibers and PET fibers shown as an example in this embodiment is used as the impact-resistant member 40, and a corrugated tube, a shrinkable tube, a PVC tube, or the like may also be used, for example.

There is no limitation to the configuration in which the impact-resistant member 40 covers each of the wires 10. That is, the impact-resistant member 40 may also collectively cover the wires 10.

The cross-sectional shape of the exterior member 30 is not limited to a flattened elliptic shape shown as an example in this embodiment, and may be changed to a desired shape such as a circular shape, a semicircular shape, a polygonal shape, or a square shape.

The exterior member 30 is not limited to a corrugated tube shown as an example in this embodiment, and may be changed to a grommet, a braided member made of resin or metal, or the like as appropriate.

The holes 29 are not limited to drainage holes shown as examples in this embodiment. The holes 29 may also be heat dissipation holes for dissipating heat trapped in the protective member 20, inspection holes for checking the inside of the protective member 20, or attachment holes to which a band for fixing a member inserted into the protective member 20 to the protective member 20 is to be attached.

The number of the holes 29 is not limited to two, and may also be one or three or more.

The lid portion 22 may also be omitted.

The shape of the protective member is not limited to that shown as an example in this embodiment, and may be changed as appropriate. That is, the protective member may have a curved portion extending in the extension direction of the wires 10, or a bent portion.

There is no limitation to the configuration in which the wires of the wire harness are routed under the floor of a vehicle. That is, it is sufficient that the wires of the wire harness are used to electrically connect devices installed in a vehicle.

What is claimed is:

1. A wire harness comprising:
   a plurality of wires;
   a cover that covers the plurality of wires;
   a plurality of cushions that each cover a respective one of the wires, the cushions being provided between the plurality of wires and the cover;
   a braid made of metal that covers the plurality of wires inside the cover, wherein the cushions are provided between the plurality of wires and the braid; and
   at least one exterior member that covers a respective portion of the plurality of wires that extends outward from a first end of the cover, the at least one exterior member being more flexible than the cover, wherein:
   the cover includes (i) a lid and (ii) a main body, the main body including (a) a bottom wall and (b) two side walls that each extend from a respective side edge of the bottom wall toward the lid,
   the cover is provided with a plurality of holes in an intermediate portion of the bottom wall in an extension direction of the plurality of wires, the holes being spaced apart in the extension direction of the plurality of wires, and
   the cushions are provided between the at least one hole and the plurality of wires in a first direction intersecting the extension direction.

2. The wire harness according to claim 1, wherein the cover has a longer dimension in the extension direction of the plurality of wires than in a direction perpendicular to the extension direction of the plurality of wires.

3. The wire harness according to claim 1, wherein the at least one exterior member comprises two exterior members that respectively cover two portions of the plurality of wires that respectively extend outward from (i) the first end of the cover and (ii) a second end of the cover.

4. The wire harness according to claim 1, wherein the at least one exterior member comprises a corrugated tube.

\* \* \* \* \*